(12) United States Patent
Stephens et al.

(10) Patent No.: US 6,758,587 B2
(45) Date of Patent: Jul. 6, 2004

(54) LIGHT EMITTING DIODE LICENSE LAMP WITH REFLECTOR

(75) Inventors: Newel L. Stephens, Madison, IN (US); Timothy W. Brooks, Madison, IN (US)

(73) Assignee: Grote Industries, Inc., Madison, IN (US)

( * ) Notice: Subject to any disclaimer, the term of this patent is extended or adjusted under 35 U.S.C. 154(b) by 51 days.

(21) Appl. No.: 09/888,971

(22) Filed: Jun. 25, 2001

(65) Prior Publication Data

US 2002/0196638 A1 Dec. 26, 2002

(51) Int. Cl.$^7$ ................................................. B60Q 1/56
(52) U.S. Cl. .................. 362/497; 362/517; 362/545; 362/546
(58) Field of Search ............................ 362/497, 498, 362/499, 241, 247, 516, 545

(56) References Cited

U.S. PATENT DOCUMENTS

| | | | |
|---|---|---|---|
| 959,431 A | 5/1910 | Holt .............................. 116/42 |
| 1,151,401 A | 8/1915 | Rousch | |
| 1,238,763 A | 9/1917 | Harris ......................... 362/499 |
| 1,408,726 A | 3/1922 | Fagan ......................... 362/498 |
| 1,481,101 A | 1/1924 | Kowalak ..................... 362/499 |
| 1,664,025 A | 3/1928 | Etheridge ................... 362/497 |
| 4,733,335 A | 3/1988 | Serizawa et al. ........... 362/373 |
| 4,868,723 A | 9/1989 | Kobayashi ................... 362/308 |
| 4,929,866 A | 5/1990 | Murata et al. .............. 313/113 |
| 5,029,053 A | 7/1991 | Solow ......................... 362/497 |
| 5,062,027 A | 10/1991 | Machida et al. ............ 362/216 |
| 5,067,057 A | 11/1991 | Stapel ......................... 362/304 |
| 5,093,768 A | 3/1992 | Ohe ............................ 313/113 |
| 5,408,772 A | 4/1995 | Pettyjohn ...................... 40/200 |
| 5,528,474 A | 6/1996 | Roney et al. ........... 264/372.13 |
| 5,700,080 A | 12/1997 | Okuda ......................... 340/479 |
| 5,803,579 A | 9/1998 | Turnbull et al. ............ 362/230 |
| 5,934,798 A | 8/1999 | Roller et al. ................ 362/230 |
| 6,069,440 A | 5/2000 | Shimizu et al. ............. 313/486 |
| 6,095,663 A | 8/2000 | Pond et al. ................. 362/240 |
| 6,163,038 A | 12/2000 | Chen et al. ................. 257/101 |

*Primary Examiner*—Sandra O'Shea
*Assistant Examiner*—Guiyoung Lee
(74) *Attorney, Agent, or Firm*—Woodard, Emhardt, Naughton, Moriarty and McNett

(57) ABSTRACT

An apparatus for illuminating a license plate includes a reflector, one or more light emitting diodes mounted on a substrate, all positioned within a housing. The light emitting diode or diodes project light directed at the reflector. The reflector has a surface geometry for redirecting the light through a window in the housing such that it substantially uniformly illuminates the license plate. The apparatus preferably does not include a lens. The apparatus may include a light emitting diode or diodes and a curved free form reflector. The apparatus may also include a plurality of reflectors or reflector segments, each corresponding to a light emitting diode.

28 Claims, 7 Drawing Sheets

LIGHT EMITTING DIODE LICENSE LAMP WITH REFLECTOR

This invention relates generally to an apparatus for illuminating license plates using one or more light emitting diodes in conjunction with a reflector.

BACKGROUND OF THE INVENTION

Government regulations for illuminating license plates exist at both the federal and sometimes the state level. Federal regulations for illuminating license plates are expressed in Federal Motor Vehicle Safety Standards (FMVSS). These standards require the ratio of illumination intensity measured at the two highest and the two lowest circular test points on the license plate not exceed 20:1. Additionally, the minimum illumination per test point must be at least 0.75 Ft-c. There are eight test points proscribed as being approximately one inch in diameter. Four are located on centers that are spaced one inch from each corner. The remaining four are located one inch from the lengthwise centerline and one inch from the top and bottom edges. A figure illustrating the positioning of these test points may be found in U.S. Pat. No. 5,067,057 to Stapel issued Nov. 19, 1991, FIG. 1 of which is herein incorporated by reference. The illumination is substantially uniform if the ratio of illumination intensity is within the above described FMVSS limit.

A variety of solutions to the government requirements exist. Many are elaborate structures mounted near the license plate having one or more lamp assemblies. These assemblies generally depend on incandescent bulbs and/or filaments as a light source. Shortcomings of such light sources are finite lifetimes, sensitivity to vibration and mechanical shock as well as power consumption, heat generated and size and weight. The FMVSS require an even distribution of light that is not too strong and not too weak. Thus, known lamp assemblies often require various combinations of condenser and/or diffuser lenses to be used in conjunction with the light source to refract the light so that it will illuminate the license plate evenly across the whole surface of the plate.

The addition of lenses and/or other optical components may add to the cost and complexity of the lamp assembly. Other problems in meeting government requirements include the need to prevent light from escaping from the lamp assembly in a rearward direction. Some state regulations regarding vehicle light allow only 50 millicandelas or less of white light to be emitted to the rear of the vehicle. Many of the currently produced license lamps are painted on the side to the rear, or require a bracket or other opaque element between the lamp and the rear of the vehicle to prevent white light from traveling in that direction.

The present invention addresses one or more of the above problems in a novel and nonobvious way.

SUMMARY OF THE INVENTION

In one form the present invention is an apparatus for illuminating a license plate of a vehicle without a lens. The apparatus includes a housing and a reflector positioned within the housing. The apparatus further includes a light emitting diode positioned within the housing. The light emitting diode projects light directed at the reflector. The reflector has a surface geometry for redirecting the light through a window in the housing such that it substantially uniformly illuminates the license plate.

In another form of the present invention there is an apparatus for illuminating a license plate of a vehicle. The apparatus includes a light emitting diode and a curved free form reflector. The apparatus further includes a housing substantially enclosing the diode and the reflector. The reflector in the housing redirects light projected by the diode through a window in the housing toward the license plate.

In another form of the present invention there is an apparatus for illuminating a license plate of a vehicle. The apparatus includes a plurality of light emitting diodes mounted to a substrate. The apparatus further includes a plurality of reflector segments, each reflector segment corresponding to one of the plurality of light emitting diodes. The apparatus also includes a housing substantially enclosing the plurality of light emitting diodes and the plurality of reflector segments. Each reflector segment redirects light projected by the corresponding one of the plurality of light emitting diodes through a window in the housing toward the license plate.

In yet another form of the present invention there is an apparatus for illuminating a license plate of a vehicle. The apparatus includes a light emitting diode projecting light directed substantially away from the vehicle and a housing substantially enclosing the light emitting diode. The apparatus further includes lensless means within the housing for substantially preventing light from the diode from escaping the housing in a rearward direction and for redirecting the light through a window in the housing toward the license plate.

One object of the present invention is to provide a unique light emitting diode license plate lamp design.

Related objects and advantages of the present invention will be apparent from the following description.

DESCRIPTION OF THE PREFERRED EMBODIMENTS

Figure 1:
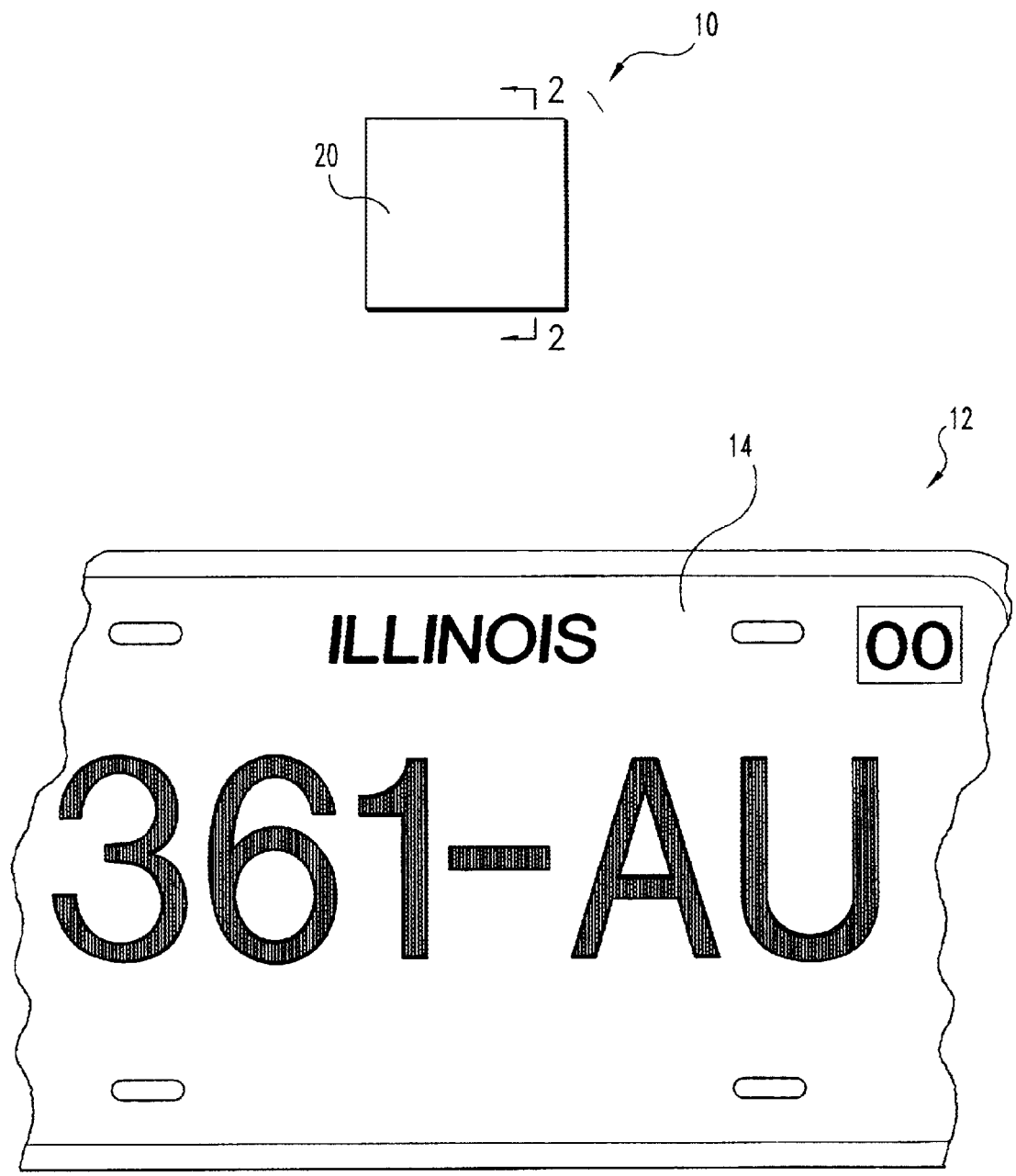
FIG. 1 is a fragmented rear view of one form of the present invention mounted above a license plate of a vehicle.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
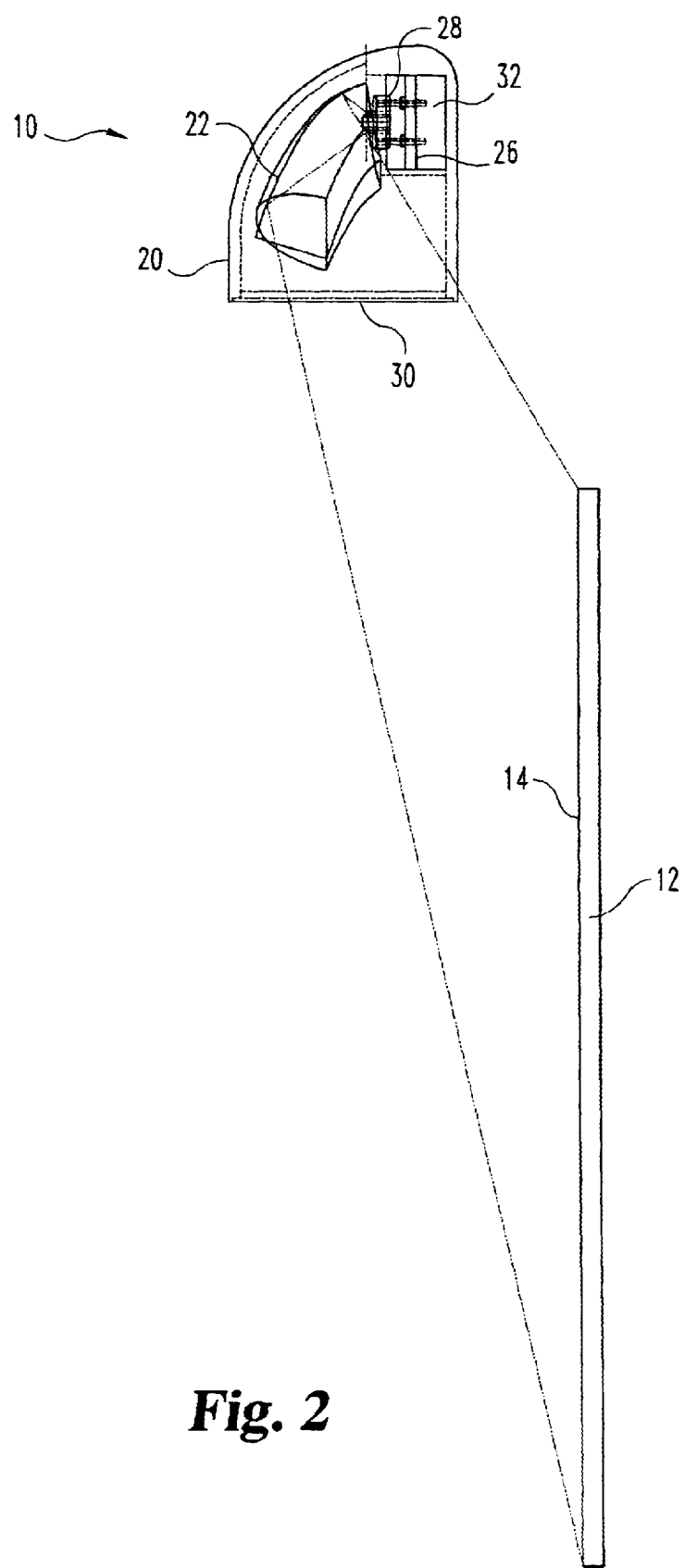
FIG. 2 is a side view along the lines 2—2 of FIG. 1.
Figure 3:
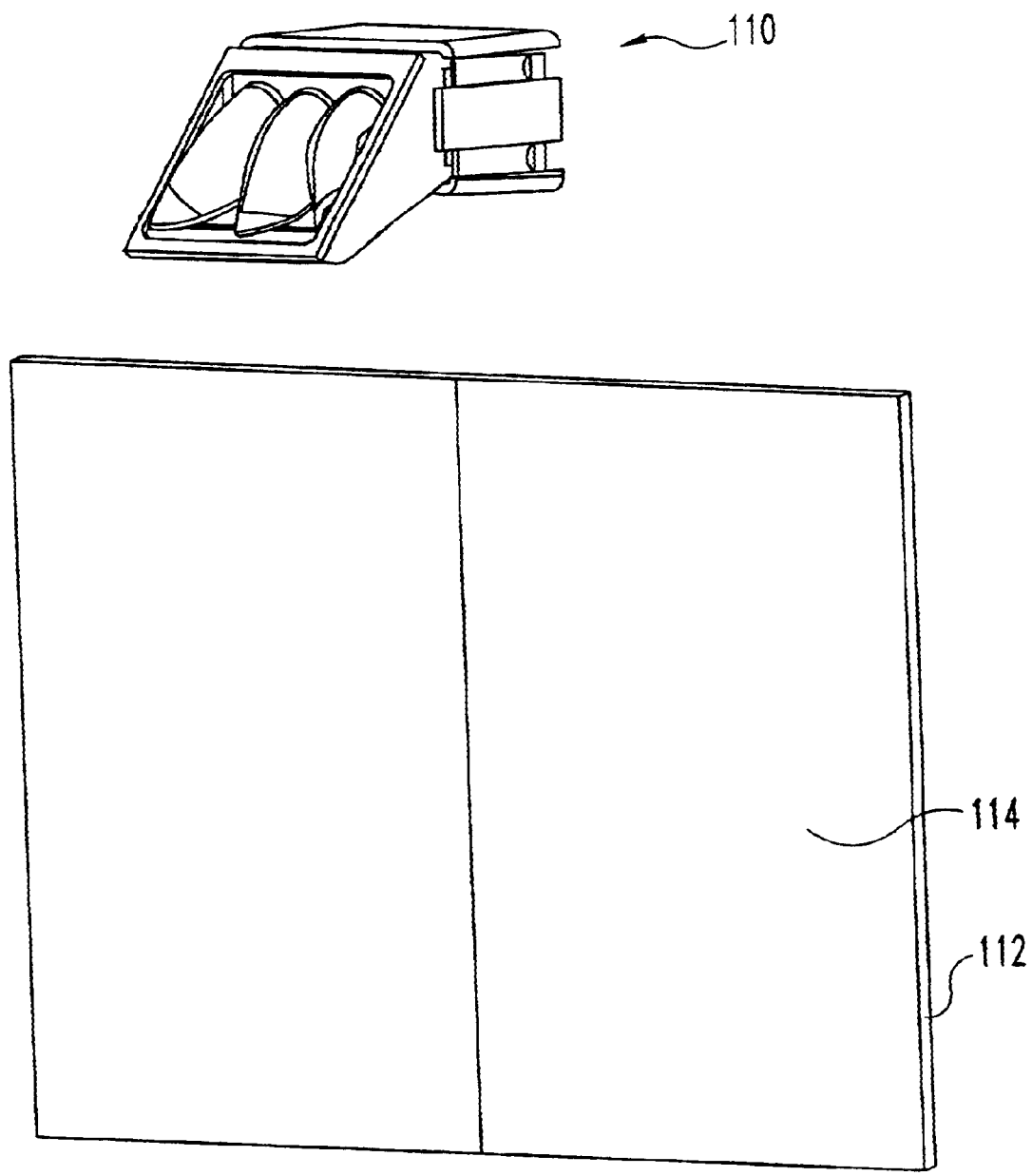
FIG. 3 is a perspective view of a preferred form of the apparatus of the present invention.
Figure 4:
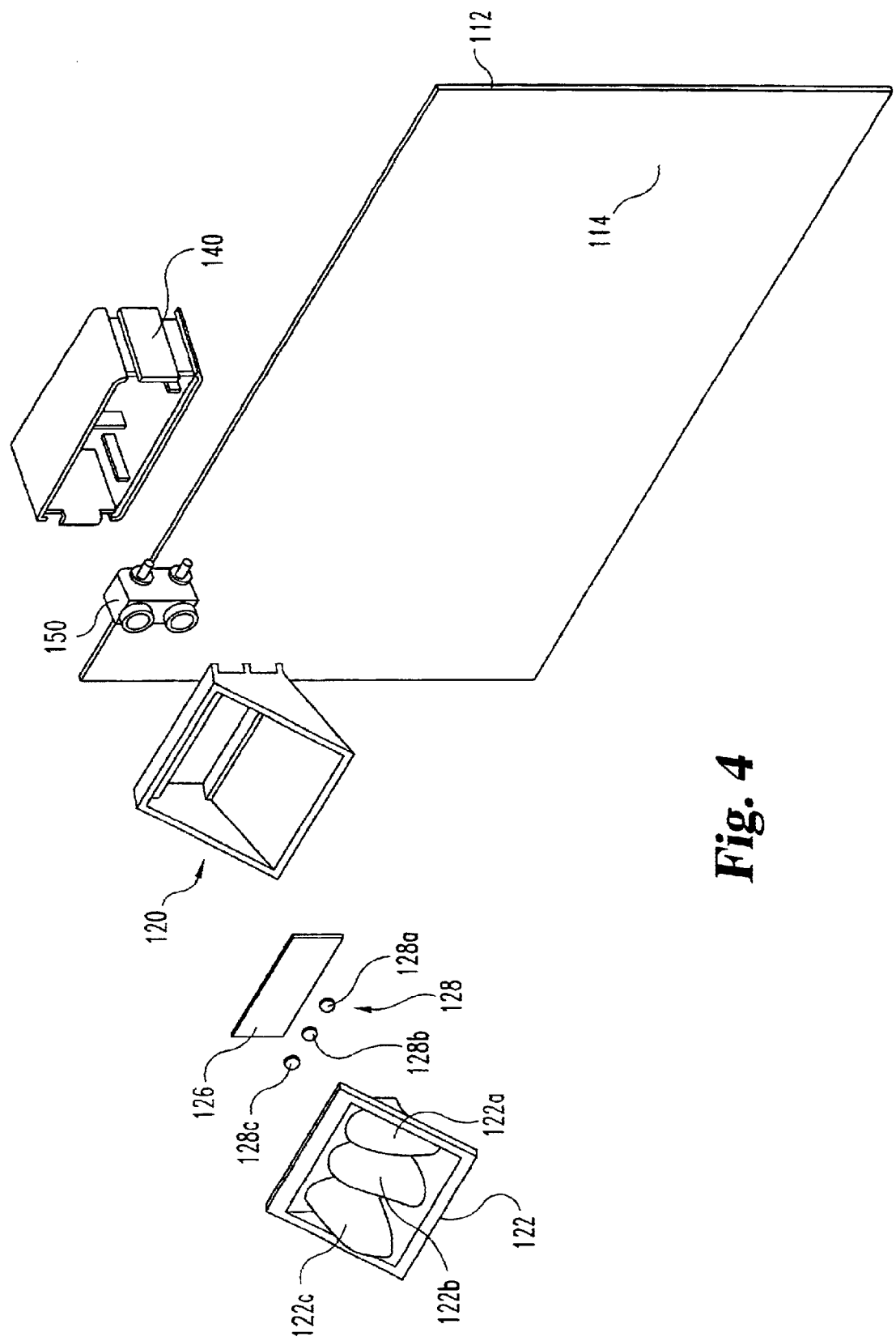
FIG. 4 is an exploded view of the apparatus of FIG. 3.
Figure 5:
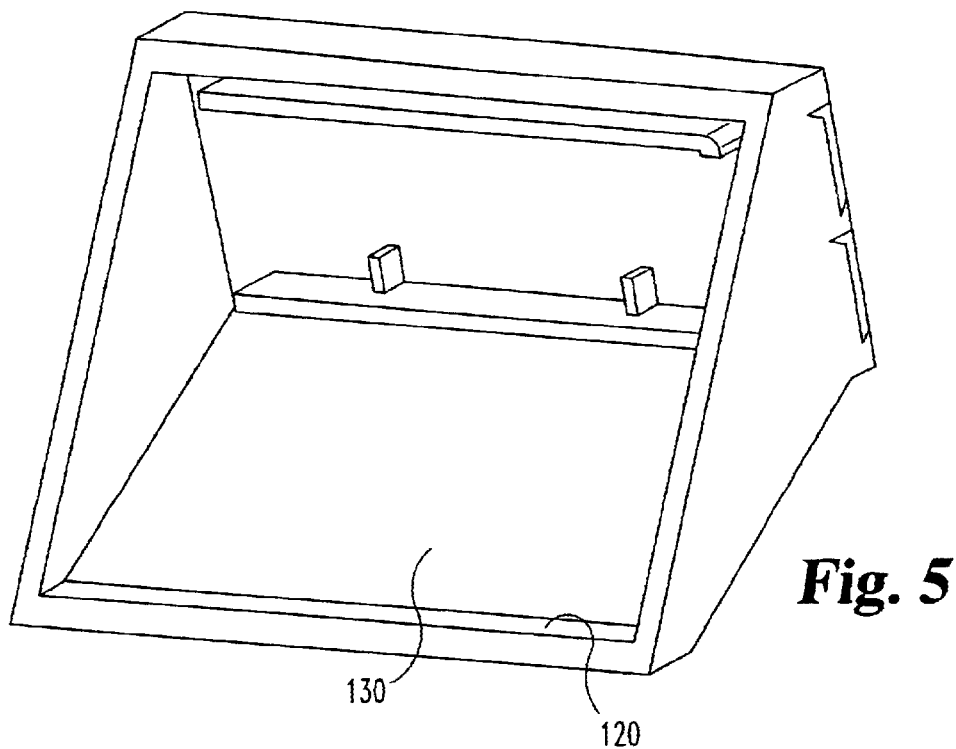
FIG. 5 is an enlarged perspective view of a portion of the housing of FIG. 4.

With references to FIGS. 1 and 2 there is illustrated one form of the present invention. With reference to FIG. 1, the apparatus 10 for illuminating the front surface 14 of license plate 12 includes a housing 20. The license plate 12 is attached to a vehicle (not illustrated) in any of a variety of ways known to one of ordinary skill in the art. The housing 20 of apparatus 10 is affixed to the vehicle spaced apart from the license plate 12 in any of a variety of ways known to one of ordinary skill in the art, such as a mounting bracket. For example, the housing 20 may include an attachment member that attaches the apparatus 10 directly to the vehicle or to a bracket mounted to the vehicle. The housing 20 is preferably centered about the lengthwise center of the license plate 12.

With reference to FIG. 2 further details of the interior of the housing 20 of apparatus 10 are illustrated. The housing 20 encloses the functional parts of the apparatus 10 and at least partially protects the functional parts from the environment. The housing 20 encloses a circuit board or other substrate 26 containing one or more light emitting diodes ("LEDs") 28. The substrate 26 is a circuit board or other device designed to hold electronic components and direct electrical power from the vehicle wiring to the light emitting diodes 28. The light emitting diodes 28 emit light that is preferably directed substantially away from the vehicle. The light from the light emitting diodes 28 is substantially intercepted by the reflector or reflectors 22. The reflector 22 serves to redirect the light from light emitting diodes 28 through a substantially transparent window 30 onto the front surface 14 of license plate 12 in a substantially uniform fashion.

The substantially transparent window 30 of housing 20 serves to protect the interior components of apparatus 10 from the dusty and dirty exterior environment. Additionally, a potting material 32 is used to seal the light emitting diodes 28 and the substrate 26, thus protecting the substrate 26 and light emitting diodes 28 from moisture and preventing corrosion. For example, the potting material 32 may be an epoxy resin such as the epoxy resin disclosed in U.S. Pat. No. 5,528,474 to Roney et al. issued on Jun. 18, 1996, and assigned to the assignee of the present application, which is herein incorporated by reference. A small lamp with only a few light emitting diodes does not produce as much waste energy, however, thus the heat transfer capabilities of the material disclosed in U.S. Pat. No. 5,528,474 to Roney et al. will not always be necessary. In the current preferred commercial embodiment discussed below the potting material is preferably Trigger Cure 4-20476 Adhesive manufactured by Dymax Corporation of Torrington, Conn. which is a two part material that cures in one hour or can be cured by ultraviolet light in a few seconds. The ultraviolet curability of this material allows rapid processing of parts on an assembly line. A well around the substrate or circuit board is filled with the material, then the part is placed into a small curing machine, where it is exposed to the correct wavelength and intensity of light. The part travels through the machine in a minute or two, after which it goes to the next step in the assembly process. If large number of light emitting diodes or other light sources are used, however, the heat transfer capabilities of the material disclosed in U.S. Pat. No. 5,528,474 to Roney et al. may be necessary.

Numerous alternatives for various elements of the forms of the invention described herein are contemplated as within the scope of the invention. Some of these variations will now be described.

The light illuminating the license plate should be white light. A variety of light emitting diodes are contemplated for use in producing white light. In one form of the present invention the light emitting diodes contain two or more dies that emit differing colors of light that, when combined, produce white light as disclosed in U.S. Pat. No. 5,803,579 to Turnbull et al. issued on Sep. 8, 1998 which is incorporated herein by reference. In another form of the present invention the light emitting diodes produce white light by emitting blue or ultraviolet wavelength light from the light emitting diode die and combining that light with light produced through interactions with phosphors in the light emitting diode lens as disclosed in U.S. Pat. No. 6,069,440 to Shimizu et al. issued on May 30, 2000 which is incorporated herein by reference. In yet another form of the present invention the light emitting diodes produce white light by emitting two or more wavelengths from a single light emitting diode die that combine together as disclosed in U.S. Pat. No. 6,163,038 to Chen et al. issued on Dec. 19, 2000 which is incorporated herein by reference. Additionally, white light may be produced by having the reflector mix light of different wavelengths together. For example, if red, green and blue light emitting diodes are clustered close together and emit light into a properly designed reflector, the reflector will mix the light, thus producing white light, and will redirect the light onto the license plate in a substantially uniform manner.

The reflector's shape may include one or more flat elements and/or one or more curved elements. Curved elements contemplated as within the scope of the invention include, but are not limited to, various conic sections. The reflector or reflectors of the present invention may be parabolic reflectors or reflectors with segments of parabolas (or ellipsoids or other conic sections). It should be understood that the reflector may be a free form curve and need not be a conic section. It should also be understood that the reflector may be smooth, that is to say, when the reflector is viewed by an observer the reflector appears to be one piece. While the reflector may be free form it may still appear as one piece. Alternatively, the reflector may be faceted, that is to say, when the reflector is viewed by an observer, the reflector appears to be multiple pieces or segments, but the individual segments may be flat or curved. As discussed below in more detail, in the current preferred commercial embodiment the reflector includes three elements or segments, the shape of each element being made by sweeping an elliptical arc along a parabolic curve.

It should be understood that it is contemplated as within the scope of the invention that the reflector can be mounted in different positions within the housing to allow for the possibility of illuminating license plates mounted at different angles and distances away from the license lamp. It should also be understood that it is contemplated as within the scope of the invention that each light emitting diode may have a corresponding reflector segment. When the light emitting diode is one of a plurality of light emitting diodes there are preferably a plurality of reflector segments, each reflector segment preferably corresponding to one of the plurality of light emitting diodes. The reflector segments may each be an individual reflector. Alternatively, it is also contemplated as within the scope of the invention that some or all of the of the reflector segments may be integrally formed as part of a larger substantially smooth reflector. For example, as discussed below in more detail with respect to the current preferred commercial embodiment, the reflector may include three integral segments, each segment redirecting the light from a corresponding one of three light emitting diodes.

It should further be understood that it is contemplated as within the scope of the invention that the reflector may be made integral with the housing or as a separate piece. In either scenario the reflector will be substantially opaque and will prevent the light from escaping to the rear of the vehicle. The reflector may function mainly by specular reflection or may function mainly by diffuse reflection or may function by some combination of both. The reflector, though, preferably functions mainly by specular reflection.

Previous inventions overcame the disadvantage of incandescent bulbs by replacing the bulb with many light emitting diodes. The use of many light emitting diodes, however, was not necessarily the most efficient optical solution to the problem. One disadvantage of a light emitting diode is that, compared to incandescent bulbs, they emit less total light. That light is also emitted in a well-defined cone, rather than into a complete sphere like an incandescent bulb. While lenses with optical spreading elements may be used to evenly spread the light from incandescent bulbs onto a license plate, the smaller amount of luminous flux available from light emitting diodes needs to be more carefully controlled in order to be used to maximum effect. The high cost of light emitting diodes, especially white light emitting diodes, suggests that the optical system used to direct the light from the light emitting diodes needs to be as efficient as possible.

In many situations reflectors are able to collect more of the available light from a given light source and, due to the computer-aided design tools now available, reflectors may be designed to direct the light collected into nearly any desired direction or pattern. When properly designed, a reflector may also illuminate the license plate in a smoother fashion, giving a more pleasing appearance than the use of lens optics. The above described forms of the present invention using a reflector may not require an opaque element or elements. Instead, the reflector is a means for collecting substantially all of the light traveling in a rearward direction and redirecting it onto the license plate. Similarly, the apparatus of the present invention, through use of a properly designed reflector, may obviate the need for condenser and/or diffuser lenses as generally required in systems of the prior art. The window of the housing of the present invention need not be a lens to more evenly distribute light to satisfy FMVSS. The window of the housing is only present to protect the functional parts from the environment.

Known systems generally have light that impinges directly on the front surface of the license plate. In contrast, the apparatus of the present invention does not have light impinging directly on the license plate. This helps to achieve substantially uniform illumination. License lamps of the prior art will often directly illuminate the top center of the plate. Thus, the license lamps of the prior art are very bright at the top center of the plate compared to the bottom outer corner test points. This difficulty is avoided with the design of the present invention. Given that the LED license lamp of the present invention is preferably mounted above the centerline of the license plate, there may still be some disparity in intensity of illumination between the top center of the plate as compared to the bottom outer corner test points. It is, however, smaller than that found in license lamps of the prior art. It may be further reduced by having two license lamps of the present invention positioned above the license plate and spaced apart from the centerline or, alternatively, positioned to the left and right ends of the license plate.

Figure 6:
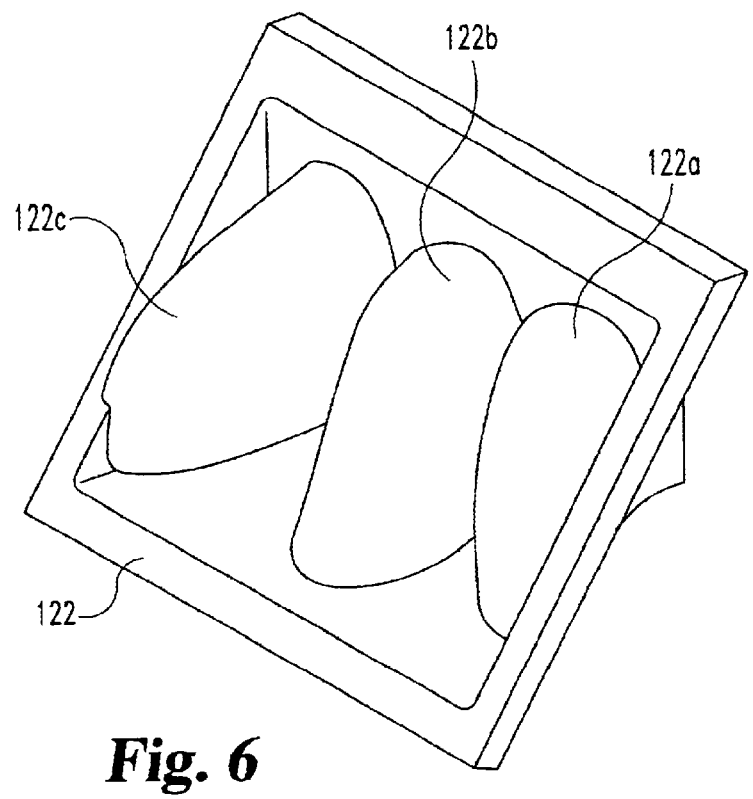
FIG. 6 is an enlarged perspective view of the reflector portion of the housing of FIG. 4.
Figure 7B:
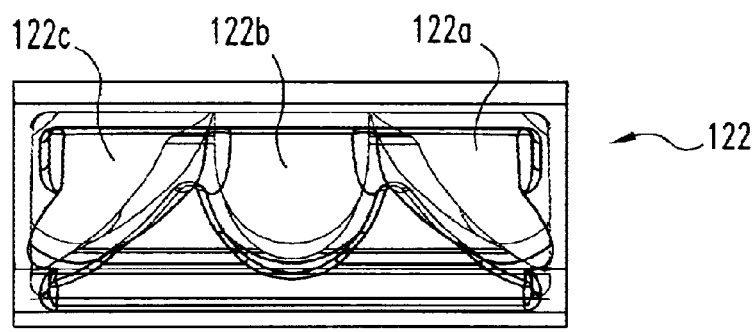
FIGS. 7A–C are top, bottom and side views of the reflector portion of the housing of FIG. 6.
Figure 7A:
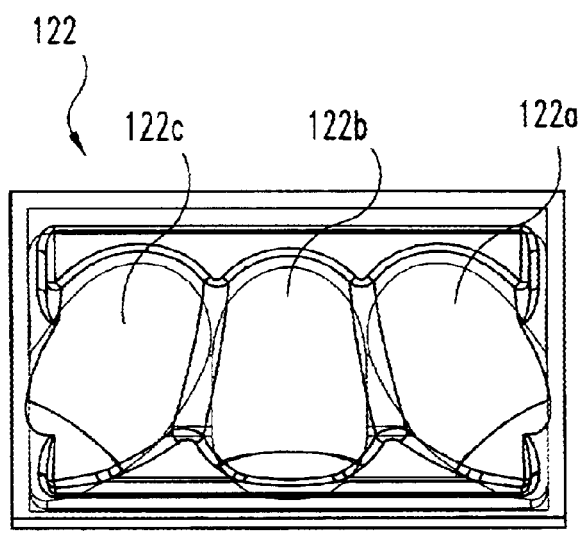
Figure 7C:
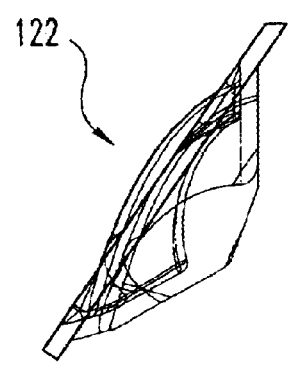
Figure 8:
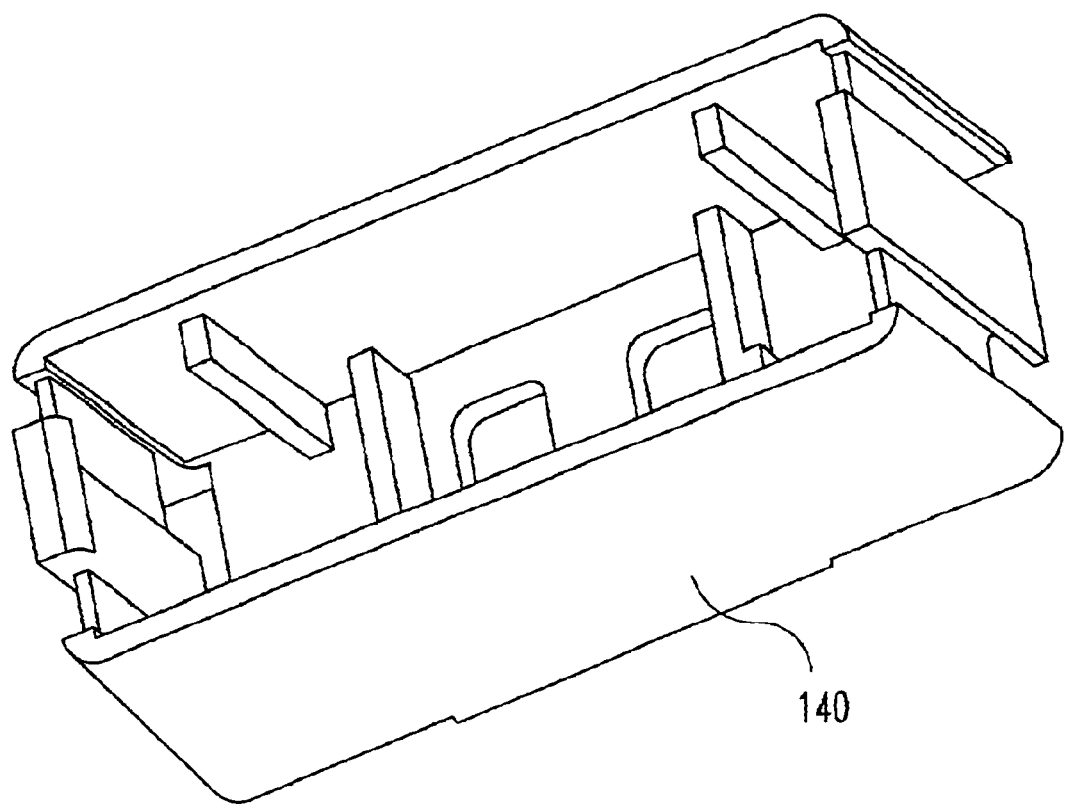
FIG. 8 is an enlarged perspective view of the mounting bracket of FIG. 4.

With reference to FIGS. 3–8, the current preferred commercial embodiment of the present invention will now be described, it being understood that variations as described above and/or known to those of skill in the art are contemplated as within the scope of the invention. The apparatus 110 has a substrate 126 that includes three white light emitting diodes 128a–c substantially linearly aligned along the lengthwise axis of the license plate 112. With reference to FIGS. 6–7, the reflector 122 is preferably smooth and has three segments 122a–c made by sweeping an elliptical arc along a parabolic curve. Each of the segments 122a–c substantially corresponds to and substantially redirects the light from a corresponding one of the three light emitting diodes 128a–c (see FIG. 4). The light emitting diodes 128a–c are pointed substantially to the rear of the vehicle, the corresponding reflector segments 122a–c collecting the majority of the light emitted by each corresponding light emitting diode 128a–c and redirecting it in a forward direction onto the front surface 114 of the license plate 112. The entire housing is attached to the vehicle by a mounting bracket 140 for attachment to the vehicle (not illustrated) and may or may not have an intervening connector 150 as preferred. The reflector housing portion 122 is preferably attached to the substantially transparent housing portion 120, the housing portions preferably being glued or sonic welded together. The reflector housing portion 122 is opaque, the interior surface facing the light emitting diodes 128a–c preferably being aluminized or painted with a specularly reflective paint or other reflective layer known to those of skill in the art. The substantially transparent housing portion 120 is preferably integral with the substrate 126 (itself preferably integral with the light emitting diodes 128a–c) and the window 130 through which light is redirected onto the license plate. Housing portion 120 is preferably molded out of substantially transparent material, preferably some type of plastic such as clear polycarbonate or acrylic. The reflector housing 122 may be molded in a desired color as preferred.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined only by the claims that follow. In reading the claims it is intended that when words such as "a", "an", "at least one", "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus for illuminating a license plate of a vehicle, comprising:

a housing;

a reflector positioned within the housing;

a light emitting diode positioned within the housing;

wherein the light emitting diode projects light directed at the reflector, the reflector having a surface geometry for redirecting the light through a window in the housing such that it substantially uniformly illuminates the license plate; and wherein the light emitting diode projects light in a direction substantially in the rear of the vehicle and the reflector redirects the light in a forward direction onto the license plate.

2. The apparatus of claim 1, further comprising a substantially transparent cover for the window of the housing.

3. The apparatus of claim 1, wherein the light emitting diode emits white light.

4. The apparatus of claim 1, further comprising an attachment member securing the housing to the vehicle near the license plate.

5. The apparatus of claim 1, wherein the light emitting diode is mounted on a substrate, the substrate being attached to an interior surface of the housing.

6. The apparatus of claim 5, further comprising an electrical circuit connected to the light emitting diode and a potting material to seal the electrical circuit and the light emitting diode.

7. The apparatus of claim 1, wherein the light emitting diode is one of a plurality of light emitting diodes and the reflector includes a plurality of corresponding reflector segments, each reflector segment redirecting light from the corresponding light emitting diode.

8. The apparatus of claim 1, wherein the reflector includes a parabolic reflector segment.

9. The apparatus of claim 1, wherein the reflector includes a free-form reflector segment.

10. The apparatus of claim 1, wherein the reflector is substantially smooth.

11. The apparatus of claim 1, wherein the reflector is integral with at least a portion of the housing.

12. The apparatus of claim 1, wherein the light emitting diode is one of a plurality of light emitting diodes.

13. The apparatus of claim 12, wherein there are three light emitting diodes, and wherein the reflector is one of three reflectors, each reflector corresponding to one of the three light emitting diodes.

14. The apparatus of claim 1, wherein the apparatus does not include a lens.

15. An apparatus for illuminating a license plate of a vehicle, comprising:
  a light emitting diode;
  a curved free form reflector;
  a housing substantially enclosing the diode and the reflector,
  wherein the reflector redirects light projected by the diode through a window in the housing toward the license plate;
  wherein the apparatus does not include a lens; and,
  wherein the light emitting diode projects light in a direction substantially to the rear of the vehicle and the reflector redirects the light in a forward direction onto the license plate.

16. The apparatus of claim 15, further comprising a substantially transparent cover for the window of the housing.

17. The apparatus of claim 15, wherein the light emitting diode is one of a plurality of light emitting diodes.

18. The apparatus of claim 17, wherein the plurality of light emitting diodes emit different colors of light that cumulatively create white light.

19. The apparatus of claim 17, wherein the plurality of light emitting diodes are mounted on a substrate, the substrate being integral with at least a portion of the housing.

20. The apparatus of claim 17, further including a plurality of reflector segments, each reflector segment corresponding to one of the plurality of light emitting diodes.

21. The apparatus of claim 15, further comprising an attachment member securing the housing to the vehicle near the license plate.

22. The apparatus of claim 15, wherein substantially no light escapes the apparatus in a rearward direction.

23. An apparatus for illuminating a license plate of a vehicle, comprising:
  a plurality of light emitting diodes mounted to a substrate;
  a plurality of reflector segments, each reflector segment corresponding to one of the plurality of light emitting diodes;
  a housing substantially enclosing the plurality of light emitting diodes and the plurality of reflector segments,
  wherein each reflector segment redirects light projected by the corresponding one of the plurality of light emitting diodes through a window in the homing toward the license plate, the reflector segments being configured to substantially uniformly illuminate the license plate; and
  wherein the light emitting diode projects light in a direction substantially to the rear of the vehicle and the reflector redirects the light in a forward direction onto the license plate.

24. The apparatus of claim 23, further comprising a substantially transparent cover for the window of the housing.

25. The apparatus of claim 23, further composing an attachment member securing the housing to the vehicle near the license plate.

26. The apparatus of claim 23, wherein the apparatus does not include a lens.

27. The apparatus of claim 23, wherein each reflector segment is an individual reflector.

28. The apparatus of claim 23, wherein the plurality of reflector segments are all part of one substantially smooth reflector.

* * * * *